United States Patent [19]

Litt

[11] 4,181,477
[45] Jan. 1, 1980

[54] PUMP VALVE
[75] Inventor: Kenneth C. Litt, Silver Spring, Md.
[73] Assignee: Pace Incorporated, Silver Spring, Md.
[21] Appl. No.: 882,799
[22] Filed: Mar. 2, 1978
[51] Int. Cl.² .................................. F04B 21/02
[52] U.S. Cl. ....................... 417/560; 137/512.15; 137/512.4; 417/566
[58] Field of Search ............. 417/560, 566, 380, 395; 137/512.15, 512.4, 859

[56] References Cited
U.S. PATENT DOCUMENTS

| | | | |
|---|---|---|---|
| 568,362 | 9/1896 | MacSpadden | 137/851 X |
| 1,619,481 | 3/1927 | Oakes | 417/531 |
| 2,669,979 | 2/1954 | Kiekhaefer | 137/512.4 |
| 2,809,589 | 10/1957 | Randolph | 417/566 X |
| 2,880,584 | 4/1959 | French | 137/859 X |
| 2,980,032 | 4/1961 | Schneider | 137/512.4 |
| 3,045,605 | 7/1962 | Nutten et al. | 137/859 X |
| 3,127,906 | 4/1964 | Balster | 137/493 |
| 3,314,600 | 4/1967 | Hadley | 417/566 |
| 3,356,100 | 12/1967 | Seeler | 137/102 |
| 4,086,036 | 4/1978 | Hagen et al. | 417/566 X |

FOREIGN PATENT DOCUMENTS 1428007  12/1968  Fed. Rep. of Germany ........... 417/566
2162031   6/1973  Fed. Rep. of Germany ........... 417/566

Primary Examiner—Carlton R. Croyle
Assistant Examiner—Edward Look
Attorney, Agent, or Firm—Fidelman, Wolffe & Waldron

[57] ABSTRACT

The inlet and discharge valves of a pump are each comprised of a circular valve plate centered in a circular cutout in a flat valve sheet. Diametrically opposed webs join the valve plate to the main body of the valve sheet and perforations in the webs provide both, spring action and allow for air passage.

2 Claims, 6 Drawing Figures

PUMP VALVE

BACKGROUND OF THE INVENTION

The present invention relates to one-way inlet and discharge valves for pumps and more particularly to the design of valve plates and mountings for small compressors which have high flexibility and long life.

In the design of many pumps and compressors it is preferred to have one-way valves which open in response to a pressure differential in the flow medium. This pressure differential lifts the valve plate from the valve seat allowing the flow medium to pass through the valve porting. A reversal of the pressure differential causes the valve to seat and prevents flow. These valve plates may be for example, circular disks or of the flat reed type.

The flow characteristics and the energy losses incurred in the media passing through the valve can significantly affect the overall efficiency of the pump, especially in gas compressors where pressure differentials and flow velocities can be high. It is desirable that the valve open quickly, cleanly, fully and close quickly and tightly. Unfortunately valve openings and closings flex the valve plate and mountings, inducing stresses which are highly repetitive and frequently reversing as well. Desire for a pump with a long and trouble-free operating life suggests the use of thick valve plates and mountings having little flexure. This approach is suited to static valves, for example, pressure relief valves where the number of occasions which require the valve to open and reseat are relatively few. However, in a pump or compressor the high cycle rate limits the usefulness of heavier, rigid valve materials first, because of the high energy which is required merely to lift the valve plate. Additionally, low flexure of the valve plate provides a small flow opening and incurs higher pressure losses for a given flow rate or requires a large valve.

The other approach is to use thin, flexible materials which will require little energy to flex and provide a full flow opening. Except where relatively costly metal alloys and synthetic plastics are used, the thin, flexible valve plate and mountings suffer from relatively early stress and fatique failures. Irreversible elongation of materials during flexure can also be an important parameter where elastomer materials are used.

The difficulties hereinabove pointed out are well known to the art. U.S. Pat. Nos. 1,619,481; 2,669,979 and 3,314,600 disclose one-way valve designs used in pumps and engines where high cycle life is a requisite. U.S. Pat. Nos. 568,362; 3,127,906 and 3,356,100 disclose one-way valve designs which are subjected to infrequent cycling.

What is desirable is a simple, economical valve plate construction of minimum mass (and cost) which provides high flexibility for full, rapid and efficient valve opening, seals tightly on the valve seat, and has a long operating life.

Also desirable for pump valves are good aerodynamics of gas flow, low clearance volumes, quiet operation, and ease of maintenance and servicing. The valve material should be resistant to corrosion, wear and fatique, able to withstand high impact loads.

SUMMARY OF THE INVENTION

The inlet and discharge portage of the pump of this invention incorporates two similar circular valve plates formed in a singular, thin, planar valve sheet. The valve plates are centered inside circular cutouts in the valve sheet and are joined to the main body of the valve sheet by diametrically opposed webs. The web area is small. When only two webs are employed a small perforation through each alters the web characteristics and enhances the performance and operating time-to-failure of the valve, by providing four small ligaments as the attachment of valve plate to valve sheet.

When the valve is closed the circular valve plate presses on the fixed circular valve seat. When a positive inlet to outlet pressure differential exists across the valve plate, the force on the valve plate causes the web to deflect, raising the valve plate off the valve seat and permitting flow through the valve.

It would be most desirable if the valve plate had no mass and reciprocated without delay, in straight line linear motion away from and to the valve seat in response to pressure variations. Desirable also would be a valve plate which responds without any distortion of the valve material or resistance therein to motion. Then no energy would be expended in operation of the valve and no internal stresses would be introduced into the valve plate itself or in the structure which attaches the valve plate to the valve sheet.

The one way valve of this invention is designed to approach these objectives within the limits of engineering practicality. The valve plate is fabricated of a strong lightweight elastomer material and is attached to the valve sheet by thin integral diametrically opposed webs of the elastomer. In one preferred embodiment the webs are narrowed by perforations therein so that the valve plate is relatively free of constraint. When a pressure differential occurs across the valve plate or face, the webs flex elastically while the valve plate remains relatively undistorted (because of the so much lower crossectional area of the webs). Even the ligaments are deformed minimally e.g. stressed to only 0.5–5.0 percent preferably 1–2% of the material's elastic limit, and consequently little energy is expended in deformation of the webs.

Accordingly, the valve plate is virtually free of peripheral constraint; it does not appreciably flex or distort under the pressure differentials which open the valve; thus the valve plate moves with a generally reciprocal motion. Little energy is expended to elastically deform the webs, and the low stresses induced in the webs assure long operating life. In these ways the valve of this invention is designed to approach the objectives stated above of a reciprocating valve plate having no mass.

OBJECTS OF THE INVENTION

Accordingly, an object of this invention is to provide a pump incorporating simple valving which is trouble free and long lived.

Another object of this invention is to provide a pump having valving which is highly responsive to pressure variations and is leak tight.

A further object of this invention is to provide a pump with valving which is easily and economically serviced.

Other objects, advantages, and novel features of the present invention will become apparent from the following detailed description of the invention when considered in conjunction with the accompanying drawing in which.

DESCRIPTION OF THE INVENTION

Figure 1:
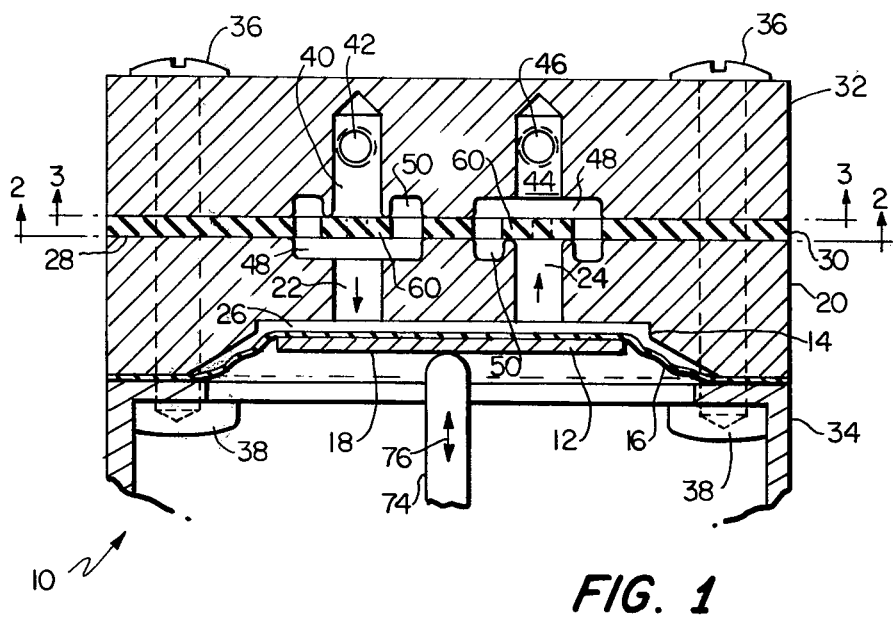
FIG. 1 is a fragmented elevational view in crosssection of the pump of this invention.
Figure 2:
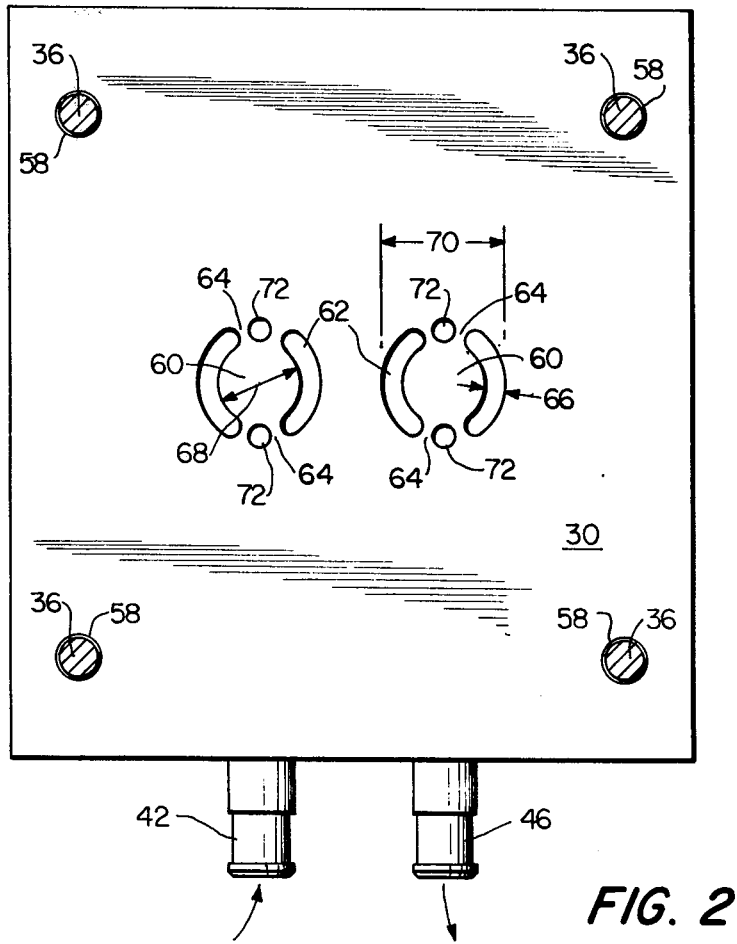
FIG. 2 is a view of the pump of this invention taken along the line 2—2 of FIG. 1.

FIGS. 1 through 4 illustrate a diaphragm air compressor 10 according to this invention comprising a circular piston 12 sealed around the edge of the shallow cyliner 14 by a flexible diaphragm 16. The piston 12 is connected to the diaphragm 16 in any suitable manner, for examples, by an adhesive bond (not shown) or rivets or bolts (not shown) such that the flexible diaphragm 16 moves with the piston 12 yet isolates the pumped media from the exterior piston surface 18 in the known manner and as explained more fully hereinafter.

The conical cylinder 14 is formed into the main pump housing 20 which includes a circular inlet passage 22 and circular discharge passage 24, both passages 22,24 communicating with the cylinder chamber 26. The pump 10 further includes a flat valve sheet 30 abutting the main housing 20, and the back housing 32 which abuts the valve sheet 30. A drive support frame 34 presses against the edges of the diaphragm 16 to provide a seal as stated above. Four bolts 36 pass through the back housing 32, valve sheet 30 and pump housing 20 and thread into bosses 38 in the support frame 34 thereby forming an integral assembly.

Circular passage 40, in the back housing 32 is concentric with the inlet passage 22 in the main housing 20, and connects to the inlet duct 42. Circular passage 44 in the back housing 32 is concentric with the outlet passage 24 in the main housing 20, and connects to the outlet duct 46. Inlet passage 22 and passage 44 terminate adjacent the valve sheet 30 in similar circular recesses 48. Discharge passage 24 and passage 40 extend to the valve sheet 30 and each passage 24,40 is encircled by a concentric groove 50 at the valve sheet 30. Desirably the diameter at the outer side 52 of the grooves 50 is slightly larger that the diameters at the outer side 53 of the recesses 48, and the inside walls 54 of the grooves 50 provide annular valve seats 56 between the passages 24,40 and the grooves 50.

The compressive force acting upon the valve sheet 30 by the clamping action of the bolts 36, due to the difference between these diameters 52, 53 causes a slight deformation of the valve sheet 30 along the periphery 80 of the recess 48. This deformatin biases the valve plate 60 to press against the seat 56 (FIG. 6) when no fluid pressure differential acts on the plate 60.

The valve sheet 30 (see FIG. 2) is rectangular with four holes 58 near the corners allowing passage of bolts 36 therethrough for assembly of the pump 10. Two circular valve plates 60, are each located concentrically within a circular cutout 62 in the valve sheet 30. Each valve plate 60 is joined to the valve sheet 30 by a pair of diametrically opposed webs 64 which span the gap 66 between the valve plate 60 and the main valve sheet 30. The diameter 68 of the valve plate 60 exceeds the inside diameter 54 of the groove 50 such that when juxtaposed the valve plates 60 are concentric with the adjacent concentric passages e.g. passages 22,40, and overlay the vlave seats 56 (FIG. 1). The diameter 70 of the circular cutout 62 is equal to or slightly less than the outside diameter 52 of the groove 50 such that the cutout gap 66 faces the groove 50 and allows unimpeded flow passage between the groove 50 and gap 66. Accordingly, the webs 64 joining the valve sheet 30 to the valve plates 60 substantially span the groove gap 66. A circular perforation 72 centered in each web 64 lightens the web 64 and increases web flexibility. The diameters of the perforations 72 substantially equal the width of the cutout gap 66 and each pair of perforations 72 is oppesdly spaced apart so as to face the groove 50 and not overlay the valve seat 56.

Figure 3:
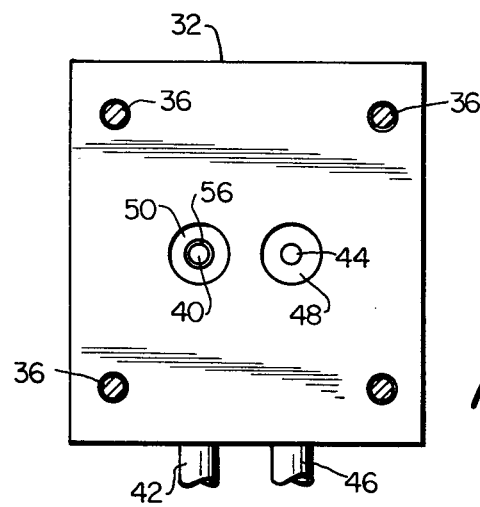
FIG. 3 is a view to a smaller scale of the pump of this invention taken along the line 3—3 of FIG. 1.
Figure 4:
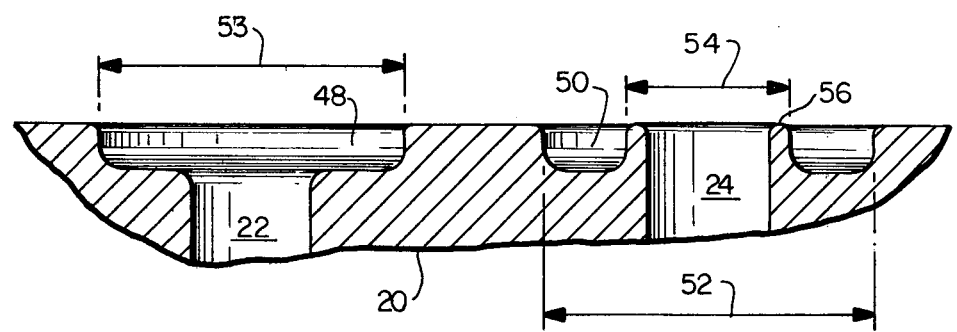
FIG. 4 is an enlarged detail from FIG. 1.

Accordingly, as illustrated in FIGS. 1,3 two similar valves are formed but with the valves oriented in the assembly to allow flow in opposite directions. The elastomer valve sheet 30 seals to the flat surfaces of the housings 20,32 under pressure of the bolts 36 and prevents out-leakage, and also seals between the valves to prevent cross-flow between inlet 42 and outlet 46.

Figure 5:
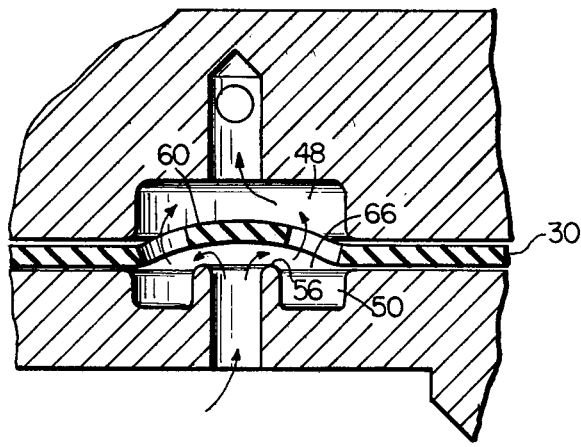
FIG. 5 is a fragmentary crossection to an enlarged scale showing the valve plate lifted from the valve seat to permit flow.

FIG. 1 illustrates a condition of equilibrium wherein the valve plates 60 rest upon the valve seats 56 without substantial flexure in the webs 64. The piston 12 is in an advanced position close to the main pump housing 20 and the enclosed volume of the cylinder chamber 26 is small. A connecting rod 74 from an electric motor drive (not shown) mounted to the drive support frame 34 gives reciprocating motion to the piston 12 as indicated by the two-headed arrow 76. As the piston 12 and diaphragm 16 are drawn away from the passages 22,24, pressure in the cylinder chamber 26 is reduced, producing a differential pressure across the valve plates 60, relative to the pressure in the passages 40, 44. At the left (FIG. 1) passages 22,40 this differential flexes the webs 64 and valve plate 60 (FIG. 5) causing the valve plate 60 to rise off the surface of the valve seat 56. The valve plate 60 nests partially within the recess 48, such that flow through the gap 66 and perforations 72 is unimpeded. Accordingly, flow media, e.g. air, water, flows through the inlet duct 42 and circular passage 40, through the cutout gap 66 and perforations 72 and enters the expanded cylinder chamber 26 via the recess 48 and inlet passage 22.

The same differential pressure which caused flow at the inlet duct 42, causes the valve plate 60 at the right (FIG. 1) to seal firmly against the valve seat 56 preventing flow from outlet duct 46 into the cylinder chamber 26. the groove 50 narrows the face of the seat 56 and concentrates the pressure forces on the valve plate 60 to provide a tight seal.

When the connecting rod 74 then drives the piston 12 and diaphragm 16 toward the passages 22,24, pressure increases within the cylinder chamber 26 causing the right side valve plate 60 to lift from the adjacent valve seat 56 allowing discharge of flow media from cylinder chamber 26 via discharge passage 24, the cutout gap 66, recess 48, the outlet passage 44 and the outlet duct 46. Concurrently the increased pressure in the cylinder chamber 26 presses the left hand (FIG. 1) valve plate 60 against the adjacent valve seat 56 and prevents backflow of media from the inlet duct 42.

Accordingly each valve assembly provides for one-way passage of flow media in response to the piston's reciprocating action. Valves with small webs 64 demonstrate superior sealing characteristics on closing and have substantially extended operating life without failure than similar valves having webs 64 without the reduction in web size caused by perforation 72. A lower resistance to flexure of the perforated web 64 allows a faster response to changing pressures and reduces the stresses in the web materials. Additionally it is suggested that the perforations 72 reduce thermal gradients in the web 64 and thereby enhance its life.

The materials, or combinations of materials, which may be used in construction of the valve sheet 30, valve plates 60 and webs 64 is not particularly limited by the desire for good flexibility, low mass and long life as discussed above since state of the art elastomers exhibit the requisite physical properties. On the other hand if metals are used for both the valve seat 56 and valve plate 60, precise mating and perfect sealing is most difficult to accomplish. However, an elastomer with the proper durometer, by its very nature, conforms under stress to any inherent irregularities in the surfaces involved, thus creating a tighter seal.

Practice of this invention is particularly adapted to small low pressure and capacity air compressors or pumps where for example the valve seat 56 is not more than 1 cm in diameter. State of the art fractional horse power motors, elastomer sheets (e.g. Neoprene), etc. can be employed for the diaphram 16 and valve sheet 30 in formation of a pump that constitutes an inexpensive source of low pressure air e.g. 30 psig. Specifically, for valve sheet 30 state of the art elastomers have sufficient tensile strength, resiliency (e.g. Yerzley Resiliance and Yerzley Hysteresis), Young's Modulus etc. to have extended life in this valving use. Thus the actual elongation of each ligaments is less than about 2% of its elastic limit and the tensile stress applied to the ligament is less than about 5% of the elastic limit. The ligament area should be 1-15% of the outlet area.

Figure 6:
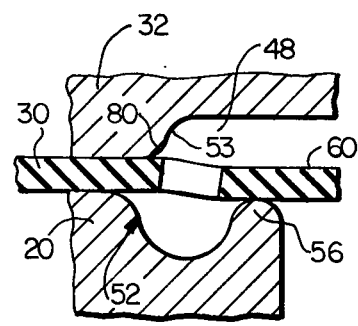
FIG. 6 is a fragmentary partial cross-section illustrating the valve in closed position.

Since elastomers conform well to irregular surfaces. The expedient shown in FIG. 6 is well adapted to provide a positive pressure seal of valve plate 60 against valve seat 56, and for adequate sealing to last the useful life of valve sheet 30 and diaphram 16.

On a low capacity embodiment of the pump of this invention which performs satisfactorily in pumping air against a 30 psi head, the valve sheet 30, including integral plates 60 and webs 64, was fabricated from a unitary sheet of neoprene rubber having a thickness of 0.031 inch, tensile strength of 1280 psi and 60 durometer (Shore A). The valve plates 60 had a diameter of 0.250 inch; the cutouts 62 were 0.406 inch O.D. The diameter of the passages 22,24,40,44 was 0.161 inch and the groove 50 was 0.221 inch T.D. and 0.437 inch O.D. by 0.060 inch deep. The recesses 48 were 0.406 inch O.D. by 0.060 inch deep. Testing indicated that stress loads on the ligaments are less than about 1% of the tensile strength. A ligament cross-section (between the perforation 72 and the cutout 62) of approximately 0.020×0.031 inch supported the 0.250 inch diameter valve plate. Sharp edges were rounded in manufacture.

What is claimed is:

1. A pump including:
    a variable internal volume chamber for temporary storge of a flow media therein;
    a first valve connected to said chamber for one-way flow of said media, therethrough, said valve comprising an elastomer valve sheet having a valve plate therein centered in arcuate cutouts through the valve sheet with cutout gaps spacing apart the valve plate from the balance of the valve sheet and with opposed flexible webs formed between cutouts connecting valve plate to valve sheet;
    an annular valve seat with a flow passage centrally thereof pressing against one surface of said valve plate and a circular recess with a flow passage from said chamber connected thereto facing the other surface of said valve plate, the flow passages being joined by way of the cutouts when the valve plate lifts from the annular valve seat;
    a groove surrounding the annular valve seat greater in diameter than the diameter of the circular recess; and
    housing wall means surrounding the groove and housing wall means surrounding the recess, said elastomer valve sheet being compressed therebetween whereby the valve plate is biased against the annular valve seat.
    a second like one-way valve connected to said chamber oriented for opposite direction flow relative to said chamber and said first valve;
    means to alternately increase and decrease the internal volume of said chamber;
    whereby expanding the volume of said chamber lifts one valve plate from its valve seat by flexure of said web, and contracting the volumne of said chamber lifts the other valve plate from its valve seat.

2. A valve comprising:
    an elastomer valve sheet having a valve plate therein centered in arcuate cutouts through the valve sheet with cutout gaps spacing apart the valve plate from the balance of the valve sheet and with opposed flexible webs formed between cutouts connecting the valve plate to the valve sheet;
    an annular valve seat with a flow passage centrally thereof against one surface of said valve plate, the flow passages being joined by way of the cutouts when the valve plate lifts from the annular valve seat;
    a groove surrounding the annular valve seat greater in diameter than the diameter of the circular recess; and
    housing wall means surrounding the groove and housing wall means surrounding the recess, said elastomer valve sheet being compressed therebetween, whereby the valve plate is biased against the annular valve seat.

* * * * *